UNITED STATES PATENT OFFICE.

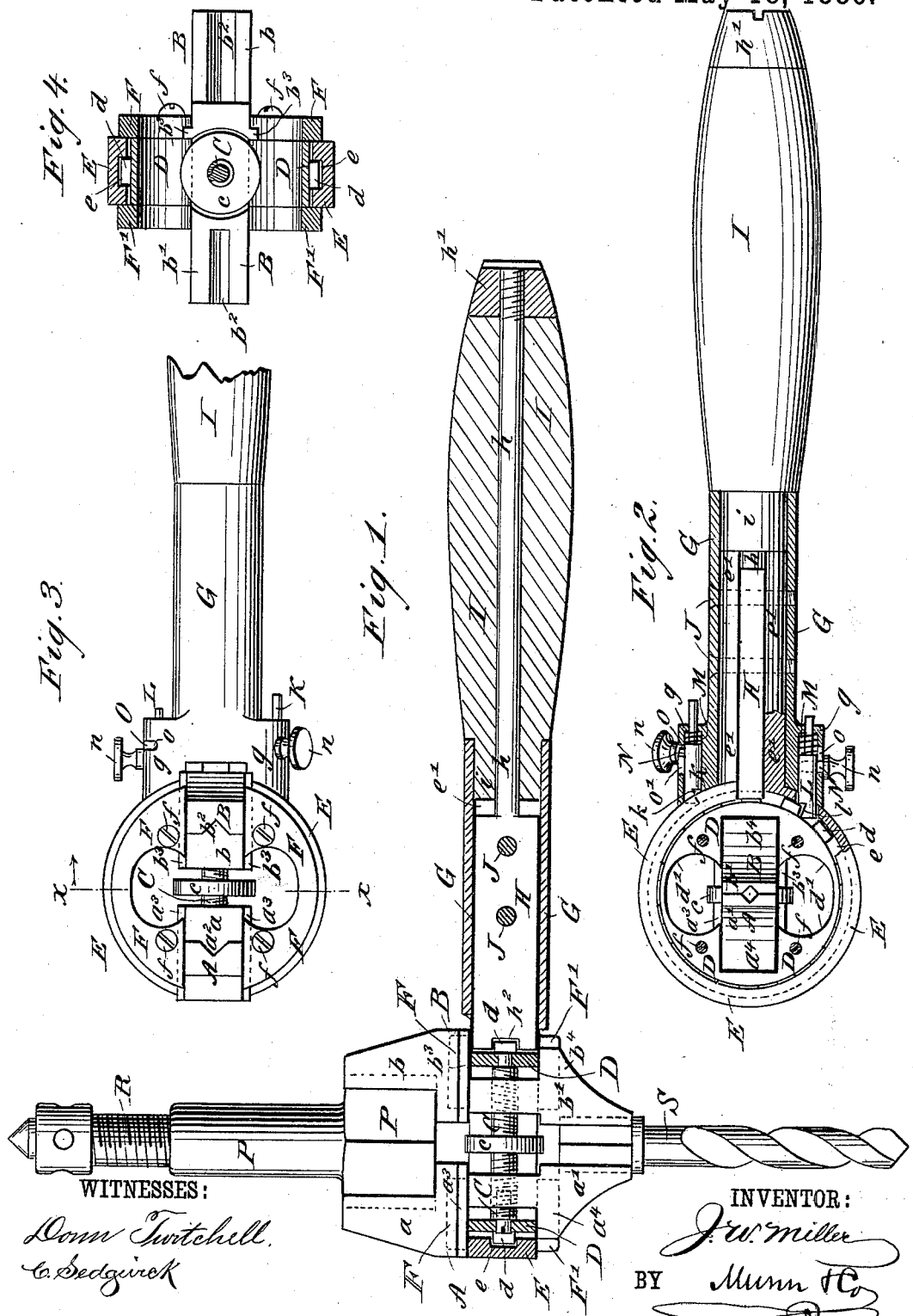
(No Model.)
J. W. MILLER.
WRENCH.
No. 342,119. Patented May 18, 1886.
WITNESSES:
Donn Twitchell.
C. Sedgwick.
INVENTOR:
J. W. Miller
BY Munn & Co
ATTORNEYS.

JOHN W. MILLER, OF MOUNT STERLING, KENTUCKY, ASSIGNOR OF ONE-HALF TO GEORGE E. MILLER, OF SAME PLACE.

WRENCH.

SPECIFICATION forming part of Letters Patent No. 342,119, dated May 18, 1886.

Application filed January 9, 1886. Serial No. 188,096. (No model.)

*To all whom it may concern:*

Be it known that I, JOHN W. MILLER, of Mount Sterling, in the county of Montgomery and State of Kentucky, have invented a new and Improved Ratchet Wrench and Drill, of which the following is a full, clear, and exact description.

The object of my invention is to provide a simple, effective, strong, and inexpensive tool adapted for use as a wrench, and also to operate drills, taps, or other tools.

The invention consists in certain novel features of construction and combinations of parts of the ratchet wrench and drill, all as hereinafter fully set forth and claimed.

Reference is to be had to the accompanying drawings, forming part of this specification, in which similar letters of reference indicate corresponding parts in all the figures.

Figure 1 is a view of the tool as adjusted for use in drilling and with the stock and head in sectional elevation. Fig. 2 is a rear view of the tool taken at a right angle to Fig. 1, and partly broken away and in section and with the rear guide-plates removed. Fig. 3 is a reverse or front view of the tool, the stock being broken away; and Fig. 4 is a transverse section taken on the line $x$ $x$, Fig. 3.

The two opposite jaws, A B, of the tool have right and left hand screw-threaded apertures, whereby the jaws are fitted to the opposite right and left hand threaded end parts of an adjusting-screw, C, which is journaled at opposite ends in and across a ring or disk, D, which is provided on its periphery with a series of studs or ratchet-teeth, $d$, which fit loosely within the internal groove, $e$, of an outer ring or head-piece, E, fixed to the handle of the tool, as presently explained. The disk D thus will be held to the head-piece E, and will be free to turn with the jaws A B within the head-piece, and the screw C may be turned by its milled finger piece or wheel $c$ within the disk D, for adjusting the jaws A B closer together or farther apart. At the opposite ends the jaws A B are provided with large and small grip or clamp heads $a$ $a'$ $b$ $b'$, respectively, thus providing for grasping larger or smaller nuts or other objects, and the acting faces of these heads will preferably be formed with angular recesses $a^2 b^2$. (See Figs. 3 and 4.) The disk D is cut away, as at $d'$ $d'$, to provide finger-holes for ready access to the screw C, for turning it, and next the disk the jaws A B are provided with tongues $a^3 b^3$, respectively, and said tongues fit snugly within rabbets or grooves formed in the guide-plates F F, which have a general semicircular form and are held to the disk D by screws $f$, which also hold the guide-plates F′ F′ to the opposite side of the disk, said plates F′ being duplicates of plates F, except that they have not rabbets or grooves like those in which the tongues $a^3 b^3$ of the jaws fit, as above described. The guide-plates F F′ overlap the edges of the ring or head-piece E; hence they not only tend to relieve the adjusting-screw C, but also relieve teeth $d$ of disk D from lateral strains caused by the use of the tool. The plates F F′ are cut away at their central inner portions, to give room for the fingers in operating the screw C. (See Figs. 2 and 4.)

The clamp-heads $a' b'$ of the jaws A B are provided with outwardly-projecting lugs $a^4 b^4$, respectively, as best seen in Fig. 1, the lugs allowing the jaws, with the screw C, to be slipped into the transverse slot in the ring D, when the faces of the jaws are closed together as in Fig. 2, and when the jaws are opened the square shoulders at the inner ends or faces of the lugs $a^4 b^4$ will overlap the ring D, and thereby relieve the screw C from lateral strain when the tool is in use, and the lugs $a^4 b^4$ also cover the screw C and shield it from the chips falling from the drill, tap, or cutter being operated.

The head-piece E, which has the form of a split ring, is provided at each side of the split or opening with the opposite stems, $e'$ $e'$, which enter the metallic socket-piece G, one at each side of the bar or plate H, which has a stem, $h$, reaching to the back end of the handle or stock I, where it receives a nut, $h'$, which when tightened securely hold the inner end stud, $i$, of the stock within the back end of the socket-piece. Screws or bolts J J, passed through the socket G, head-piece stems $e'$ $e'$, and the bar or plate H bind all these parts together in a simple construction, amply strong to resist all ordinary strains to which the tool may be subjected. The forward end of the bar H, which stands between the opposite ends of the ring or head-piece E, is slotted, as at $h^2$, Fig. 1, for the free passage of the ratchet-teeth $d$ of the jaw-holding disk D.

At opposite sides, and in the plane of the ring or head-piece E, the socket G is formed with extensions or lugs $g$ $g$, in bores of which are fitted the opposite pawls, K L, each of which has fitted on it a spiral spring, M, which normally forces the pawl forward into engagement with the ratchet-teeth $d$ on the disk D.

Into each of the pawls K L is fitted a pin or stem, N, which passes through an L-shaped slot, O, in the lug $g$, and whereby when the stem N is drawn back by its head $n$ and passed into the transverse part $o$ of slot O the pawl will be held out of engagement with the ratchet-disk, as shown by the pawl K in Fig. 2, and when the stem is turned into line with the longitudinally-ranging part $o'$ of the slot O the spring M will be free to force the pawl forward into engagement with the ratchet-disk, as shown by the pawl L in Fig. 2. Either of the pawls K L thus may be engaged with the ratchet-disk D, to turn it and the nut or tool held by the jaws A B either to the right or left hand, as required.

The pawls K L have side notches, forming inclined faces $k$ $l$, respectively, which act on the teeth $d$ to turn the disk D and jaws A B, and the extreme forward end of the pawls strike the teeth and force the pawls back on the return movement of the stock after each forward movement of the ratchet-disk.

When the tool is to be used for drilling or tapping, an internally-screw-threaded stock or head, P, will be clamped in the wrench-jaws $a$ $b$, and so that when the screw-threaded thrust and feed bar R, which is fitted into head P, is turned one way the drill or tap S, held in the opposite jaws, $a'$ $b'$, of the tool, will be fed forward to the work, while the stock I of the wrench is turned forward and back to rotate the drill or tap in either direction, accordingly as the pawl K or L is acting on the ratchet-disk D, and as will readily be understood.

I am aware that the head of a ratchet-wrench has been formed of two plates, between which the ratchet-wheel was held. This ratchet-wheel was provided with lugs and with a rectangular opening for the shanks of the movable double clamping-jaws. These jaws were formed in two parts, and were operated by a right-and-left screw swiveled in the aforesaid lugs. The shanks of the jaws were slotted to receive a bridge-piece, which, when in place in the ratchet-wheel, divided its rectangular opening into two parallel slots. Two pivoted pawls were secured between the plates of the head-piece to act on the ratchet-wheel, and a bolt was pivoted between the said pawls to hold one or the other of said pawls out of engagement with the ratchet-wheel, and I claim no such construction as of my invention.

Having thus described my invention, what I claim as new, and desire to secure by Letters Patent, is—

1. The combination of the head E, having a circular opening, of the disk or ring D, within said opening, and having peripheral ratchet-teeth and a central rectangular opening, the grasping-jaws passed through said opening, a right-and-left screw passed through the shanks of the jaws and swiveled in the end walls of the rectangular opening within the ring or disk, and a central finger piece or wheel on the screw between the two jaws, space being left in the ring or disk to receive the operator's finger for operating the finger piece or wheel, and a pawl for engaging the ratchet-teeth, substantially as set forth.

2. The combination, with the head E, having a circular opening and a circular recess, $e$, of the disk D, within the opening, and provided with peripheral teeth entering the recess $e$, a central rectangular opening and finger-recesses, $d'$, at right angles to the said opening, the jaws A B, having shanks extending through said rectangular opening, a right-and-left screw, C, passed through the said shanks and swiveled within the disk at opposite ends of the rectangular opening, the finger piece or wheel $c$ on the screw in alignment with the recesses $d'$ $d'$, and an operating-pawl and handle, substantially as set forth.

3. The combination of the head E, the ring or disk D within the same, and having ratchet-teeth and a central rectangular opening, the heads A B, having large and small clamp-heads $a$ $b$ $a'$ $b'$, the lateral guide-tongues $a^3$ $b^3$ at opposite sides of the bases of the clamp-heads $a$ $b$, which bases overlap the disk D and the head E, the right-and-left screw passed through the shanks connecting the clamping-heads, and swiveled within the rectangular recess of the disk D, the operating finger-piece $c$ on the screw, the guide-plate F, secured to the face of the disk, grooved to receive the tongues $a^3$ $b^3$, and overlapping the space between the disk and head, and an operating pawl and handle, substantially as set forth.

4. The combination, with the head and the rotary peripherally-toothed disk having adjustable jaws, of the stock connected to the head and provided with longitudinally-sliding pawls engaging the ratchet at opposite sides of the stock, the pawls having inclined notches in the inner sides of their outer ends, said ends being beveled outwardly in opposite directions, as and for the purpose set forth.

5. The combination, with the head and the peripherally-toothed disk therein, provided with the adjustable clamping-jaws, of the stock secured to the head, and provided on its opposite sides in the plane of the disk with longitudinally-apertured lugs $g$ $g$, having L-shaped slots, sliding spring-pressed pawls in said lugs, and operating-pins N $n$, extending through said slots into connection with the sliding pawls, substantially as set forth.

6. The combination, with the ratchet-disk and its jaws, of the split or divided head surrounding the disk, and having the two parallel stems $e'$ $e'$, and the tubular socket G, within which the stems are secured, substantially as set forth.

7. The combination, with the ratchet-disk and its jaws, of the head E, divided and having the two parallel stems projecting from its meeting ends, the tubular socket within which the stems pass, the handle, a bar projecting from the forward end of the handle into the space between the two parallel stems, and screws extending transversely through the socket-bar and stems, substantially as set forth.

8. A wrench consisting, essentially, in the divided ring-shaped head E, having the parallel stems $e'\ e'$, projecting from its ends, the ratchet-disk D, held within the head, the jaws A B, working in a rectangular opening in the disk, the right-and-left screw journaled within the disk and passing through the shanks of the jaws, the socket G, receiving the stems $e'\ e'$ and having the longitudinally-sliding pawls K L on its sides in the plane of the disk, the handle I, the rod $h$, extending therethrough, and having the plate H, extending into the socket between the stems $e'\ e'$, the nut $h'$ on the outer end of the rod $h$, and the screws J, passed transversely through the socket, stems, and plate, substantially as set forth.

JOHN W. MILLER.

Witnesses:
CLARENCE GILKEY,
JOSEPH W. BARNES.